C. L. SCHWARZ.
WHEEL TIRE.
APPLICATION FILED JAN. 29, 1912.
1,070,189.
Patented Aug. 12, 1913.
2 SHEETS—SHEET 2.
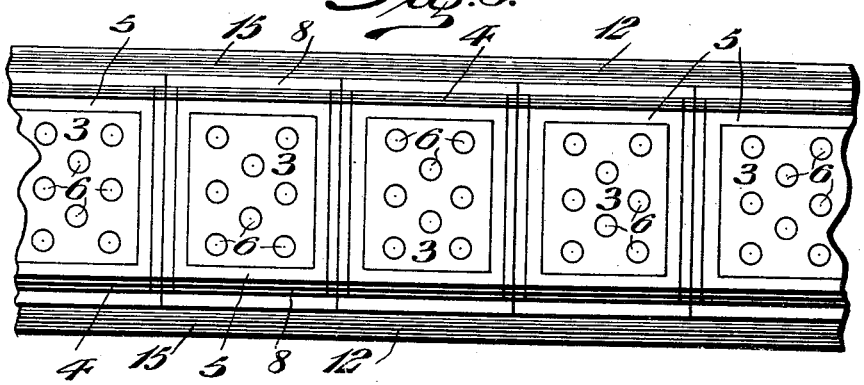
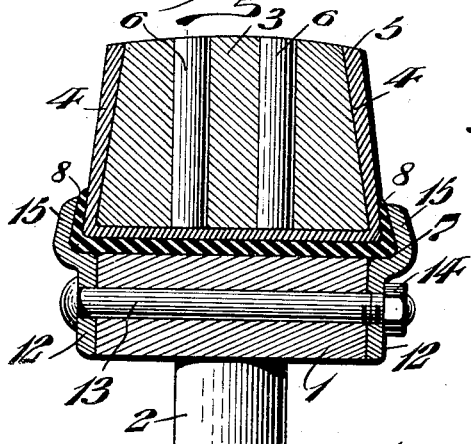
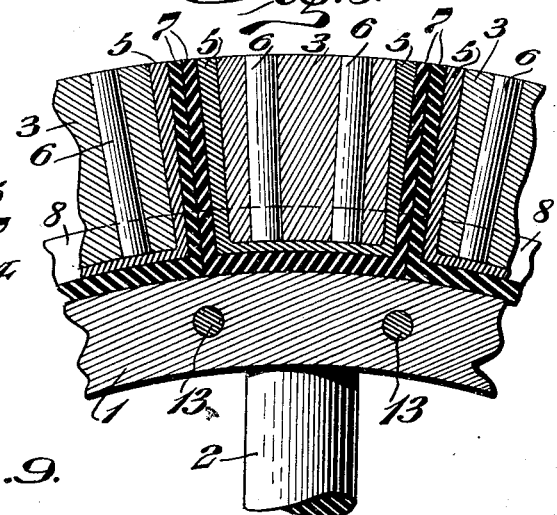
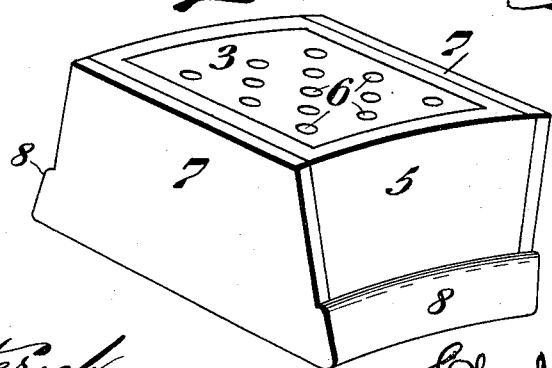
WITNESSES
H. G. Dieterich
L. Douville
INVENTOR
Charles L. Schwarz
BY
Oppenheim + Fairbault
ATTORNEYS
COLUMBIA PLANOGRAPH CO., WASHINGTON, D. C.

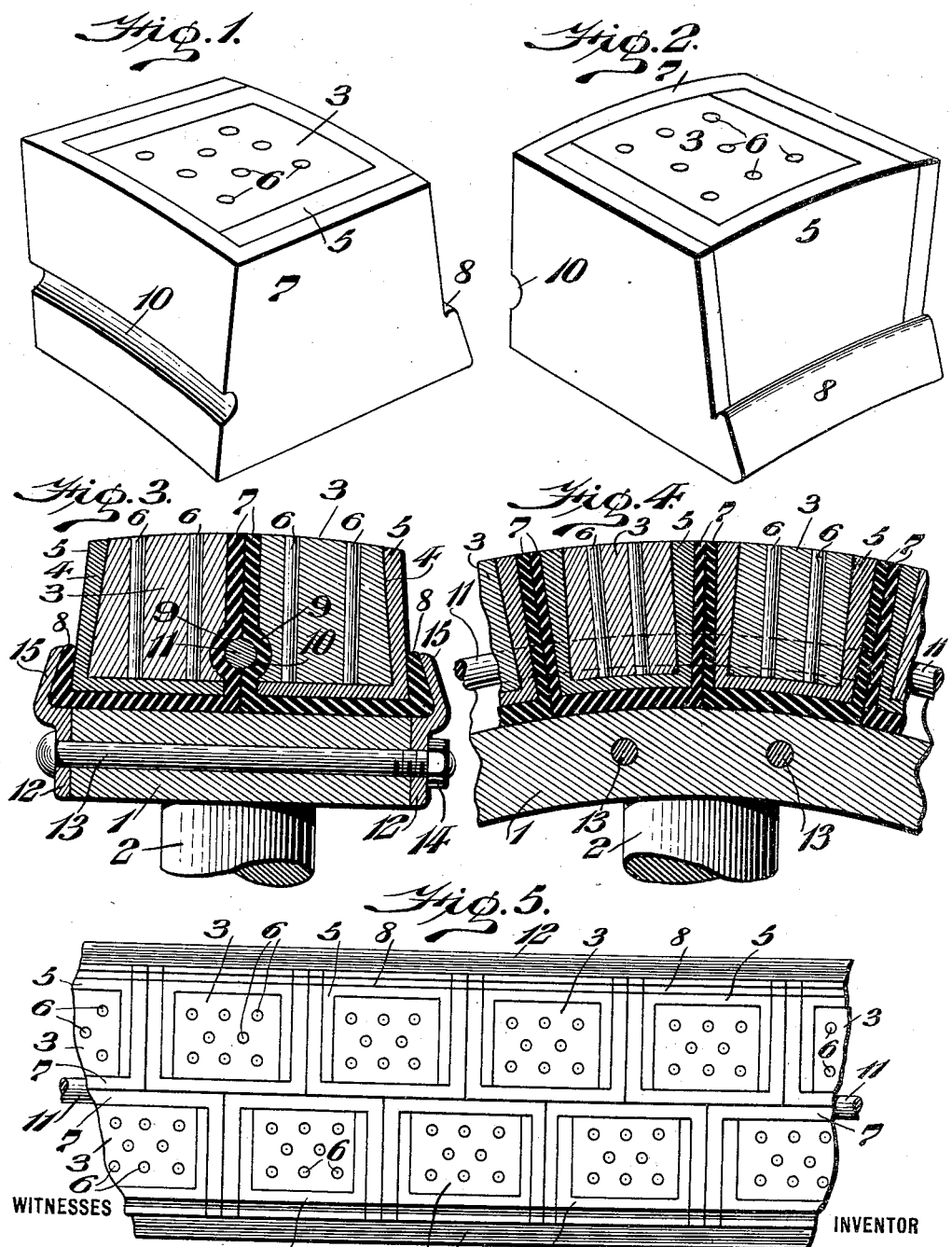

UNITED STATES PATENT OFFICE.

CHARLES LOUIS SCHWARZ, OF PHILADELPHIA, PENNSYLVANIA.

WHEEL-TIRE.

1,070,189.            Specification of Letters Patent.      Patented Aug. 12, 1913.

Application filed January 29, 1912. Serial No. 674,014.

*To all whom it may concern:*

Be it known that I, CHARLES L. SCHWARZ, a citizen of the United States, residing in the city and county of Philadelphia, State of Pennsylvania, have invented a new and useful Wheel-Tire, of which the following is a specification.

My invention consists of an improved tire for a vehicle wheel.

It further consists of such a tire composed of blocks or sections having yielding joints and wear-resisting surfaces.

It further consists of other novel features of construction, all as will be hereinafter fully set forth.

The invention is satisfactorily illustrated in the accompanying drawing, but the important instrumentalities thereof may be varied, and so it is to be understood that the invention is not limited to the specific arrangement and organization shown and described.

Figures 1 and 2 represent perspective views taken from different sides, of one of the blocks or sections from which my improved tire is composed. Fig. 3 represents a transverse section of a wheel-rim provided with my improved tire. Fig. 4 represents a longitudinal section of a portion of the rim and tire. Fig. 5 represents a plan view of a portion of the rim and tire. Fig. 6 represents a plan view of a portion of a wheel-rim and tire illustrating another embodiment of my invention. Fig. 7 represents a transverse section of such rim and tire. Fig. 8 represents a longitudinal section of a portion of this form of rim and tire. Fig. 9 represents a perspective view of one of the blocks or sections employed in this embodiment of my invention.

Similar numerals of reference indicate corresponding parts in the figures.

Referring to the drawings, the reference numeral 1 indicates the rim or felly of a wheel, and 2 indicates the spoke.

A tire is formed from quadrangular sections each of which has a quadrangular block or core, 3, preferably made from wood, fiber or similar material, and having its outer face, 4, slightly inclined. Said block is inclosed in a metal retaining jacket, 5, having its bottom closed and its inner side and its peripheral side open, and the sides which adjoin the peripherally adjacent sections in the complete tire slightly converging on radial lines to the circle of the wheel, so that the sections will be truncate wedge-shaped and may fit the circular shape of the wheel rim. Metallic pins, 6, are driven through the wooden block in a radial direction and have their peripheral ends exposed. A jacket, 7, of rubber or other yielding material incloses the metallic jacket and has its bottom closed and its outer and peripheral sides open, leaving a flange 8, at the base of the outer, open side. The inner faces of the blocks and their rubber jackets are formed with grooves, 9 and 10, respectively, and a locking-hoop, 11, fits into said grooves when the latter are assembled, face to face, thus locking the sections together. Annular clamping flange-rings, 12, are secured to the sides of the rim by bolts, 13, and nuts, 14, and the inwardly-inclined flanges, 15, of said rings clamp the rubber flanges 8 of the sections, and secure the latter to the rim of the wheel. The sections are placed in two peripheral rows upon the wheel and in staggered relation, and the locking-hoop will secure the inner sides of the sections from displacement when the two clamping rings are brought together by their bolts and nuts.

When the invention is embodied in a tire having only one peripheral series of sections, as illustrated in Figs. 6 to 9, inclusive, all four sides of the metallic jacket are closed, and the two outer sides of the rubber jacket are open and formed with the flanges 8 to be clamped by the clamping-rings.

The wooden blocks which form the cores of the sections, having their sides exposed at the periphery of the tire, offer a surface which is not as liable to slip as a complete metallic tire, and the tire will be less noisy than a metallic tire. The metallic pins in the jacket will bite into the road-surface, as will also the edges of the metallic jackets, thus affording a firm hold upon such surface and prevent skidding of the wheel. The rubber jackets of the sections will form yielding joints between the latter, admitting the sections being tightly adjusted, one against the other, and also assisting in deadening noise of the tire, forming slightly yielding cushions between the sections and between the latter and the rim. The metal jackets will confine the wooden blocks against splitting under the expanding action of the metal pins, and their closed bottoms will prevent injury of the closed bottoms of the yielding jackets by the ends of the pins in the blocks or by any roughness of the bottoms of the blocks. A strong and durable tire is thus provided which will afford a firm grip upon the road-surface and in which noise is practically deadened. Owing to its structure, the wearing-surface of the tire will resist wear, and the weight of the load upon the wheel will wedge the sections tightly. While this tire may be employed in connection with any vehicle wheel, it is especially adapted to wheels of heavy motor-trucks. The sections may be easily removed and inserted for repair or renewal by removing a clamping ring. If desired, the yielding jackets may be made continuous and in one piece, with the blocks and metallic jackets inserted in pockets therein.

Having thus described my invention what I claim as new and desire to secure by Letters Patent, is:—

1. A truncate wedge-shaped tire-section for a vehicle wheel, comprising a solid and non-yielding core, a metallic retaining jacket fitted upon said core to extend to the outer face of the same and having a closed bottom, and a yielding jacket fitted upon said metallic jacket to extend to the outer edges of the same and having a closed bottom.

2. A truncate wedge-shaped tire-section for a vehicle wheel, comprising a solid and non-yielding core, a metallic retaining jacket fitted upon said core to extend to and expose its peripheral side and having a closed bottom, metallic pins radially inserted through the core, and a yielding jacket fitted upon the metallic jacket to extend to the outer edges of the same and having an open peripheral side and a closed bottom.

3. A truncate wedge-shaped tire-section for a vehicle wheel, comprising a solid and non-yielding quadrangular core, a metallic retaining jacket fitted upon said core to extend to and expose its peripheral side and having a closed bottom, and a yielding jacket fitted upon said metallic jacket to extend to the outer edges of the same and open at its outer and peripheral sides and having a closed bottom and formed with a flange at the base of its outer side.

4. A truncate wedge-shaped tire-section for a vehicle wheel, comprising a solid and non-yielding quadrangular core, metallic pins inserted radially through said core, a metallic retaining jacket fitted upon said core to extend to and expose its peripheral side and having a closed bottom, and a yielding jacket fitted upon said metallic jacket to extend to the outer edges of the same and having a closed bottom and open outer and peripheral sides and formed with a flange at the base of its outer side.

5. A wheel tire composed of a series of wedge-shaped tire-sections fitted against the periphery of a wheel and each consisting of a solid and non-yielding quadrangular core, a metallic retaining jacket fitted upon said core to extend to and expose its peripheral side and having a closed bottom, and a yielding jacket fitted upon said metallic jacket to extend to the outer edge of the same and having a closed bottom and open exposed sides, and means for clamping said sections to the rim of the wheel.

6. A wheel tire composed of a series of wedge-shaped tire-sections fitted against the periphery of a wheel and each consisting of a solid and non-yielding quadrangular core, a metallic retaining jacket fitted upon said core to extend to and expose its peripheral side and having a closed bottom, metallic pins inserted radially through said core, and a yielding jacket fitted upon said metallic jacket to extend to the outer edges of the same and having a closed bottom and open exposed sides, and means for clamping said sections to the rim of the wheel.

7. A wheel tire composed of two peripheral rows of tire-sections upon the rim of a wheel and each comprising a quadrangular core, a metallic jacket having an open peripheral and inner side, metallic pins radially inserted in said core, and a yielding jacket fitted upon said metallic jacket and having its peripheral and outer lateral sides open and said latter side having a flange at its base, the inner sides of said cores and yielding jackets formed with registering grooves, a locking-hoop in said grooves, and clamping rings bearing against the flanges of the yielding jackets of the sections and bolted to the wheel-rim.

CHARLES LOUIS SCHWARZ.

Witnesses:
WM. CANER WIEDERSEIM,
C. D. McVAY.

---

Copies of this patent may be obtained for five cents each, by addressing the "Commissioner of Patents, Washington, D. C."